Feb. 1, 1944.　　P. J. SPINELLI　　2,340,435
WINDSHIELD WIPER BLADE
Filed Feb. 4, 1942
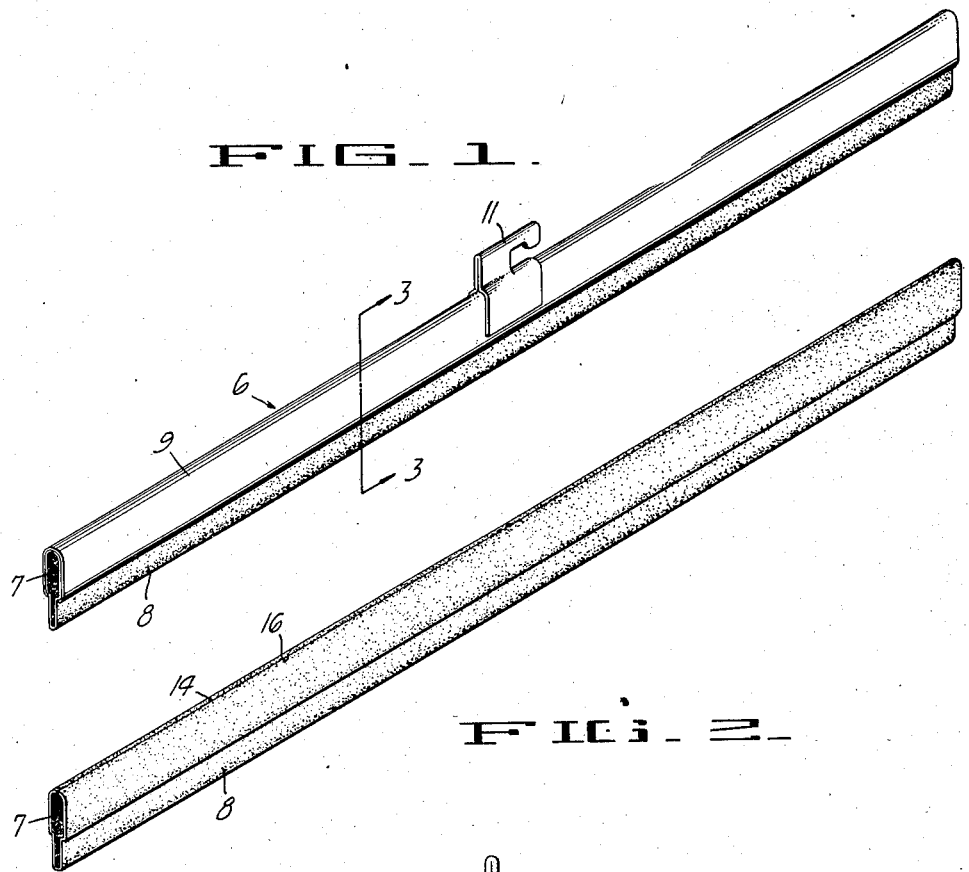
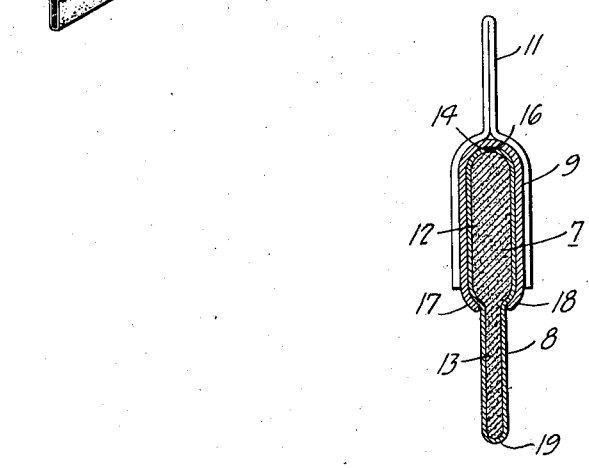
INVENTOR
Peter J. Spinelli
BY Gardner + Warren
attys.

Patented Feb. 1, 1944

2,340,435

UNITED STATES PATENT OFFICE 2,340,435

WINDSHIELD WIPER BLADE

Peter J. Spinelli, Oakland, Calif.

Application February 4, 1942, Serial No. 429,517

1 Claim. (Cl. 15—245)

The invention relates to windshield wiper blades and more particularly to the materials used in the construction of said blades.

It has been customary to construct the wiper portion of blades of the character described out of rubber. In view of the present world conditions, making rubber relatively scarce for use in articles of this type, it is desirable that an adequate substitute be provided. One of the important features obtained by the use of rubber in a device of the character described is the pliancy and flexibility of the rubber against the windshield of an automobile or the like, enabling the blade to accurately conform to and apply proper wiping pressure against the windshield. Also by reason of its flexibility, the blade rocks upon the windshield during its movement thereover and particularly at the opposite ends of its arcuate stroke so as to increase the wearing area on the blade to a maximum. Furthermore, rubber has a reasonably good life when applied to this use, generally lasting for at least a season's use.

I have found that an excellent windshield wiper and one having all of the above essential characteristics and being the equal if not the superior of a rubber windshield wiper, may be constructed out of the combination of a flexible, pliant body and a chamois covering therefor. The body may be formed of various materials such as leather and this combination has been found to give extremely good service when applied to the present use.

Another object of the invention is to provide a windshield wiper blade of the character described which may be simply, readily and inexpensively manufactured.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view of a windshield wiper blade constructed in accordance with the present invention.

Figure 2 is a view similar to Figure 1 but showing the blade with the metal clamp thereof removed.

Figure 3 is a cross section of the blade taken substantially on the plane of line 3—3 of Figure 1.

With reference more particularly to the accompanying drawing, the windshield wiper blade 6 therein depicted consists of a relatively flat elongated body or core member 7, a chamois skin covering 8, held together by a longitudinal clamp 9 extending substantially the full length of the blade and having a hook member 11 secured thereto intermediate its length in the usual manner for connection to the arm of a windshield wiper mechanism. As will be best seen from Figure 3, the body or core 7 is formed with a longitudinally extending base portion 12 and a transversely extending blade portion 13, the latter being of reduced thickness and extending approximately centrally from one longitudinal edge of the base portion 12. Any suitable flexible pliant material may be used for the body 7, although as aforementioned I have found that leather is particularly adapted for this use.

The chamois skin covering 8 may be formed and secured in various ways and for simplicity and as here shown, the chamois may be initially provided in the form of an elongated strip and folded around the body 7 so that the free longitudinal edges 14 and 16 of the skin are positioned adjacent the base portion 12 at the longitudinal side thereof opposite to the blade 13. The base portion 12 and the overlying portions of the chamois skin may then be embraced by the longitudinal clamp 9, the latter preferably being of channel shape with the longitudinal edges 17 and 18 crimped around the longitudinal edge of the base 12 adjacent the blade 13. In this manner the clamp 9 secures the several members into an integral assembly, positively prevents the working free of the chamois covering and provides the required longitudinal stiffness in the blade. The hook member 11 may be secured to the clamp 9 in any suitable way such as by means of a pressed fit, welding or the like.

Where as here in the preferred form of the invention, the body 7 is made of leather, a desirable construction is obtained by cementing the chamois skin directly to the body by means of a suitable water-proof cement. Since the chamois and the leather have approximately the same amount of expansion and contraction when wet and dry, the cemented assembly operates well as a unit under all conditions and the chamois skin is at all times properly and fully supported over its entire surface by the body member. Preferably the chamois skin is positioned with its roughened side out.

In operation the relative thickness and breadth of the transverse blade portion 13 of the body provide proper flexing of the blade during the course of its arcuate movement over the windshield and enables the free longitudinal edge 19 of the blade to rock upon the windshield so as to adequately spread the wearing area over such edge portion. The chamois skin covering is as effective as rubber for removing excess water from the windshield and is superior to rubber in removing road film, oils and the like. The chamois skin covering by reason of the construction aforesaid has a life at least equal to that of the usual rubber blade and may be periodically washed and cleaned so as to renew its useful life.

I claim:

A windshield wiper blade comprising an elongated body of flexible material having a longitudinally extending base portion along one longitudinal edge portion thereof and a reduced correspondingly extending blade portion, an elongated strip of chamois folded around said blade portion with the longitudinal free edges thereof substantially meeting at said base portion, said chamois completely surrounding both of said portions and embracing the entire surface thereof and a longitudinal clamp embracing said chamois substantially completely around the base portion and along the inner end of the reduced portion.

PETER J. SPINELLI.